US010089685B2

(12) United States Patent
Hunscher et al.

(10) Patent No.: US 10,089,685 B2
(45) Date of Patent: *Oct. 2, 2018

(54) METHODS AND APPARATUS FOR MANAGING INFORMATION IN CONNECTION WITH AN ACCOUNT-BASED RECYCLING PROGRAM

(71) Applicant: Count & Crush Systems, LLC, South Portland, ME (US)

(72) Inventors: William Hunscher, Portland, ME (US); Frank Whittier, Portland, ME (US)

(73) Assignee: Count & Crush Systems, LLC, South Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,438

(22) Filed: Apr. 28, 2017

(65) Prior Publication Data

US 2017/0236200 A1  Aug. 17, 2017

Related U.S. Application Data

(63) Continuation of application No. 14/696,850, filed on Apr. 27, 2015, now abandoned, which is a
(Continued)

(51) Int. Cl.
*G06F 17/00* (2006.01)
*G06K 7/10* (2006.01)
(Continued)

(52) U.S. Cl.
CPC ....... *G06Q 40/02* (2013.01); *G06F 17/30424* (2013.01); *G06K 7/1417* (2013.01); *G06Q 50/26* (2013.01)

(58) Field of Classification Search
CPC .............. G06F 17/00; B03B 9/00; B03B 9/06
(Continued)

(56) References Cited

U.S. PATENT DOCUMENTS 4,440,284 A   4/1984   DeWoolfson
4,579,216 A   4/1986   DeWoolfson et al.
(Continued)

FOREIGN PATENT DOCUMENTS

EP   0 389 735 A1   10/1990
EP   1 247 583 A1   10/2002
(Continued)

OTHER PUBLICATIONS

International Search Report and Written Opinion dated Jun. 7, 2006 for International Application PCT/US2006/002425.
(Continued)

*Primary Examiner* — Daniel Hess
(74) *Attorney, Agent, or Firm* — Wolf, Greenfield & Sacks, P.C.

(57) ABSTRACT

Methods and apparatus for managing information relating to recycling activities are described. One embodiment described herein is directed to a method for accessing aggregated recycling information for use and/or display in connection with an account-based recycling program. The method comprises receiving first and second container information, the first container information concerning a plurality of first containers for a first recycling transaction and the second container information concerning a plurality of second containers for a second recycling transaction. The first and second container information is stored and associated account information concerning at least one consumer account. The method further comprises accessing, in response to receiving a query relating to a plurality of recycling transactions, information relating to at least the first and second containers so as to enable the use and/or display of aggregated recycling information.

14 Claims, 12 Drawing Sheets

Related U.S. Application Data continuation of application No. 13/564,307, filed on Aug. 1, 2012, now Pat. No. 9,047,652, which is a continuation of application No. 11/336,359, filed on Jan. 20, 2006, now abandoned.

(51) Int. Cl.
  G06Q 40/02 (2012.01)
  G06F 17/30 (2006.01)
  G06K 7/14 (2006.01)
  G06Q 50/26 (2012.01)

(58) Field of Classification Search
  USPC ..................... 235/375, 462.01; 209/2, 930
  See application file for complete search history.

(56) References Cited

U.S. PATENT DOCUMENTS

| | | | |
|---|---|---|---|
| 4,829,428 A | 5/1989 | Weitzman et al. | |
| 4,943,955 A | 7/1990 | Rabian et al. | |
| 5,004,392 A | 4/1991 | Naab | |
| 5,042,634 A | 8/1991 | Gulmini | |
| 5,111,927 A | 5/1992 | Schulze | |
| 5,226,519 A | 7/1993 | DeWoolfson | |
| 5,248,102 A | 9/1993 | Bohn | |
| 5,249,689 A | 10/1993 | Wergeland et al. | |
| 5,251,546 A | 10/1993 | Wergeland et al. | |
| 5,304,744 A | 4/1994 | Jensen | |
| 5,326,939 A | 7/1994 | Schäfer | |
| 5,462,153 A | 10/1995 | Friis | |
| 5,464,976 A | 11/1995 | Scofield et al. | |
| 5,465,822 A | 11/1995 | DeWoolfson et al. | |
| 5,484,995 A | 1/1996 | Scofield et al. | |
| 5,522,311 A | 6/1996 | Horsrud et al. | |
| 5,559,319 A | 9/1996 | Peng | |
| 5,565,846 A | 10/1996 | Geiszler et al. | |
| 5,566,066 A | 10/1996 | Weitzman et al. | |
| 5,611,270 A | 3/1997 | Harrington | |
| 5,614,706 A | 3/1997 | Bard et al. | |
| 5,628,408 A | 5/1997 | Planke et al. | |
| 5,644,489 A | 7/1997 | Hagenbuch | |
| 5,832,457 A | 11/1998 | O'Brien et al. | |
| 5,860,503 A | 1/1999 | Hanserud et al. | |
| 5,888,027 A | 3/1999 | Buer | |
| 5,934,440 A | 8/1999 | Kroghrud | |
| 5,960,402 A | 9/1999 | Embutsu et al. | |
| 5,967,330 A | 10/1999 | Buer | |
| 6,000,832 A | 12/1999 | Franklin et al. | |
| 6,006,995 A | 12/1999 | Amundsen et al. | |
| 6,010,239 A | 1/2000 | Hardgrave et al. | |
| 6,124,560 A | 9/2000 | Roos et al. | |
| 6,191,691 B1 | 2/2001 | Serrault | |
| 6,199,702 B1 | 3/2001 | Buer | |
| 6,302,461 B1 | 10/2001 | Debras et al. | |
| 6,510,376 B2 | 1/2003 | Burnstein et al. | |
| 6,580,965 B2 | 6/2003 | Fujiwara | |
| 6,637,657 B2 | 10/2003 | Barkan et al. | |
| 6,648,227 B2 | 11/2003 | Swartz et al. | |
| 6,811,030 B1 | 11/2004 | Compton et al. | |
| 6,842,596 B2 | 1/2005 | Morii et al. | |
| 6,871,184 B1 | 3/2005 | Liberman | |
| 7,069,236 B1 | 1/2006 | Tsunenari | |
| 7,080,777 B2 | 7/2006 | Wagner et al. | |
| 7,248,164 B2 | 7/2007 | Regard | |
| 7,317,962 B2 | 1/2008 | Whittier | |
| 7,328,842 B2 | 2/2008 | Wagner et al. | |
| 7,347,358 B2 | 3/2008 | Ireland et al. | |
| 7,416,142 B2 | 8/2008 | Baker et al. | |
| 8,042,850 B2 | 10/2011 | Jones | |
| 8,630,944 B2 | 1/2014 | Mayo | |
| 9,047,652 B2 * | 6/2015 | Hunscher ............ | G06Q 10/30 |
| 2002/0194144 A1 | 12/2002 | Berry | |
| 2003/0140828 A1 | 7/2003 | Liu | |
| 2003/0215260 A1 | 11/2003 | Morii et al. | |
| 2004/0039595 A1 | 2/2004 | Berry | |
| 2004/0148189 A1 | 7/2004 | Stoffelsma | |
| 2004/0167799 A1 | 8/2004 | Berry | |
| 2004/0199401 A1 | 10/2004 | Wagner et al. | |
| 2004/0199545 A1 | 10/2004 | Wagner et al. | |
| 2005/0080520 A1 | 4/2005 | Kline et al. | |
| 2005/0177496 A1 | 8/2005 | Blagg et al. | |
| 2005/0246225 A1 | 11/2005 | Jorgensen | |
| 2006/0069588 A1 | 3/2006 | Ritter | |
| 2006/0089909 A1 | 4/2006 | McLeod et al. | |
| 2006/0163028 A1 | 7/2006 | Hunscher | |
| 2006/0163397 A1 | 7/2006 | Baker et al. | |
| 2006/0178933 A1 | 8/2006 | FitzGerald et al. | |
| 2006/0235808 A1 | 10/2006 | Berry | |
| 2007/0174071 A1 | 7/2007 | Hunscher et al. | |
| 2007/0174073 A1 | 7/2007 | Hunscher et al. | |
| 2007/0276686 A1 | 11/2007 | Hunscher et al. | |
| 2008/0025826 A1 | 1/2008 | Saether | |
| 2008/0027581 A1 | 1/2008 | Saether et al. | |
| 2008/0059970 A1 | 3/2008 | Gonen | |
| 2008/0086411 A1 | 4/2008 | Olson et al. | |
| 2008/0177624 A9 | 7/2008 | Dohse | |
| 2008/0283356 A1 | 11/2008 | Nordbryhn | |
| 2009/0024479 A1 | 1/2009 | Gonen et al. | |
| 2009/0138358 A1 | 5/2009 | Gonen et al. | |
| 2010/0185506 A1 | 7/2010 | Wolff et al. | |
| 2011/0108620 A1 | 5/2011 | Wadden et al. | |
| 2011/0145173 A1 | 7/2011 | Hunscher et al. | |
| 2012/0265589 A1 | 10/2012 | Whittier | |
| 2012/0292387 A1 | 11/2012 | Hunscher et al. | |
| 2013/0024252 A1 | 1/2013 | Sicklick et al. | |
| 2013/0030988 A1 | 1/2013 | Mayo et al. | |
| 2013/0075468 A1 | 3/2013 | Wadden et al. | |
| 2014/0108272 A1 | 4/2014 | Mayo et al. | |

FOREIGN PATENT DOCUMENTS

| | | |
|---|---|---|
| GB | 2 330 409 A | 4/1999 |
| KR | 485750 B | 4/2005 |
| WO | WO 00/44508 A2 | 8/2000 |
| WO | WO 02/089073 A2 | 11/2002 |
| WO | WO 2004/045990 A2 | 6/2004 |

OTHER PUBLICATIONS

International Search Report and Written Opinion dated May 23, 2006 for International Application PCT/US2006/002128.
Office Action dated May 9, 2014 for U.S. Appl. No. 11/725,698.
Office Action dated Apr. 2, 2014 for U.S. Appl. No. 13/564,307.
Office Action dated May 19, 2014 for U.S. Appl. No. 13/564,307.
Office Action dated Nov. 18, 2014 for U.S. Appl. No. 13/564,307.
[No Author Listed], Beverage Container Labeling Requirements. CalRecycle. Archived Sep. 19, 2011. http://web.archive.org/web/20110919054216/http://www.calrecycle.ca.gov/BevContainer/BevDistMan/Labeling.htm. 2 pages.
Gooch, Nickels add up faster with automated data capture. Automatic I.D. News. Feb. 1996;12(2):24.
TOMRA, "First Tomra Recycling Center Now Open in the U.K," News 2005/Jan. 2005, pp. 1-2 http://www.tomra.com/default.asp?V_DOC_ID=1341.
TOMRA, "Recycling Centers," Products/Recycling Centers/Tomra Recycling Center, pp. 1-2 http://www.tomra.com/default.asp?V_DOC_ID=1341.
TOMRA, "Return, Recycling News From TOMRA, Cutting the Cord TOMRA RVMs on the Airwaves," Winter, 2004, pp. 1-27.
TOMRA, "Return, Recycling News From TOMRA, Introducing: The TOMRA Recycling Center," Summer 2004, pp. 1-22.
TOMRA, "Return, Recycling News from TOMRA" Spring/Summer 2001, http://www.tomra.com/default.asp?V_ITEM_ID=425.
TOMRA, "Return, Recycling News from TOMRA" Winter 2001, http://www.tomra.com/default.asp?V_ITEM_ID=426.
TOMRA, "Return, Recycling News from TOMRA" Winter 2002, http://www.tomra.com/default.asp?V_ITEM_ID=428.

(56) References Cited

OTHER PUBLICATIONS

TOMRA, "TOMRA Newsletter," Summer 2004, Tomra Systems ASA-Spring/Summer 2004, pp. 1, http://www.tomra.com/default.asp?V_DOC_ID=1341.
TOMRA, "TOMRA Newsletter," Tomra Systems ASA-TOMRA Newsletter, pp. 1, http://www.tomra.com/default.asp?V_DOC_ID=1341.

* cited by examiner

METHODS AND APPARATUS FOR MANAGING INFORMATION IN CONNECTION WITH AN ACCOUNT-BASED RECYCLING PROGRAM

CROSS REFERENCE TO RELATED APPLICATIONS

The present application claims the benefit under 35 U.S.C. § 120 as a continuation of U.S. patent application Ser. No. 14/696,850, filed Apr. 27, 2015, and entitled METHODS AND APPARATUS FOR MANAGING INFORMATION IN CONNECTION WITH AN ACCOUNT-BASED RECYCLING PROGRAM, which is hereby incorporated herein by reference in its entirety.

U.S. patent application Ser. No. 14/696,850 claims the benefit under 35 U.S.C. § 120 as a continuation of U.S. patent application Ser. No. 13/564,307, filed Aug. 1, 2012, and entitled METHODS AND APPARATUS FOR MANAGING INFORMATION IN CONNECTION WITH AN ACCOUNT-BASED RECYCLING PROGRAM, which is hereby incorporated herein by reference in its entirety.

U.S. patent application Ser. No. 13/564,307 claims the benefit under 35 U.S.C. § 120 as a continuation of U.S. patent application Ser. No. 11/336,359, filed Jan. 20, 2006, and entitled TECHNIQUES FOR MANAGING INFORMATION RELATING TO RECYCLABLE CONTAINERS, which is hereby incorporated herein by reference in its entirety.

FIELD OF INVENTION

Described herein are techniques for managing information related to consumer recycling activities.

BACKGROUND

Many states have enacted legislation requiring that beverage containers carry a redemption deposit to encourage recycling. For example, a number of states impose redemption deposits of up to fifteen cents for each can, bottle, and/or other container sold. In other states in which no redemption deposit is imposed there have been extensive efforts to encourage voluntary recycling by consumers of beverage containers.

Typically, after the beverages stored in containers have been consumed, the consumer transports the containers to a return center (e.g., at a retail location such as a supermarket, or a stand-alone redemption center). The consumer may be forced to wait in line while an attendant at the return center serves other consumers. When the consumer presents the containers to the attendant, the consumer waits while the attendant counts, sorts and verifies the containers. The attendant may provide value to the consumer in exchange for the containers, such as legal tender in the amount of the total redemption deposit or some other value. Given that the consumer may be forced to wait for a significant period to receive a relatively small value in exchange for the containers, the consumer may be dissuaded from returning containers. This may hinder efforts to encourage recycling.

A return center generally houses a large, cumbersome apparatus designed to destroy containers so that the material from they are formed may be recovered for reuse. Generally, the apparatus occupies a large amount of floor space, which may be costly when located in a retail location, since that floor space might otherwise be used to stock products for sale. In addition, because the apparatus stores used beverage containers, it may give off foul odors and have an unsanitary appearance, which may further discourage consumers from visiting the return center. This may also hinder efforts to encourage consumers to recycle beverage containers.

SUMMARY

One embodiment described herein is directed to a method for accessing aggregated recycling information for use and/or display in connection with an account-based recycling program. The method comprises acts of: receiving, from at least one scanning device, first container information for a first recycling transaction, the first container information concerning a plurality of first containers; receiving, from the at least one scanning device, second container information for a second recycling transaction, the second container information concerning a plurality of second containers; storing, in at least one memory, the first and second container information; associating, in the at least one memory, the first and second container information with account information concerning at least one consumer account; receiving a query relating to a plurality of recycling transactions from at least one input device; and in response to the query, accessing in the at least one memory information relating to at least the first and second containers so as to enable the use and/or display of aggregated recycling information.

Another embodiment described herein is directed to a computer-readable storage medium encoded with instructions that, when executed on at least one processor, perform a method for accessing aggregated recycling information for use and/or display in connection with an account-based recycling program. The method comprises acts of: A) electronically receiving, from at least one scanning device, first container information for a first recycling transaction, the first container information concerning a plurality of first containers; B) electronically receiving, from the at least one scanning device, second container information for a second recycling transaction, the second container information concerning a plurality of second containers; C) electronically storing, in at least one memory, the first and second container information; D) associating, in the at least one memory, the first and second container information with account information concerning at least one consumer account; E) electronically receiving a query relating to a plurality of recycling transactions from at least one input device; and F) in response to the query, electronically accessing in the at least one memory information relating to at least the first and second containers so as to enable the use and/or display of aggregated recycling information.

A further embodiment described herein is directed to an apparatus for facilitating access to aggregated recycling information for display and/or use in connection with an account-based recycling program. The apparatus comprises: at least one input device; at least one memory to store processor-executable instructions; and at least one processor coupled to the at least one input device and the at least one memory, wherein upon execution of the processor-executable instructions by the at least one processor. The at least one processor: A) controls the at least one memory to electronically store, for a first recycling transaction, first container information concerning a plurality of first containers, the first container information being received from at least one scanning device; B) controls the at least one memory to electronically store, for a second recycling transaction, second container information concerning a plurality of second containers, the second container information being received from the at least one scanning device; C) controls the at least one memory to associate, in the at least one memory, the first and second container information with account information concerning at least one consumer account; and D) in response to a query relating to a plurality of recycling transactions from the at least one input device, controls the at least one memory to access information relating to at least the first and second containers so as to enable the use and/or display of aggregated recycling information.

Another embodiment described herein is directed to a method of managing information relating to consumer recycling activities is provided. The method comprises acts of: A) performing a recycling transaction with each of a plurality of consumers, each consumer being identifiable via a consumer identifier, each recycling transaction comprising an exchange of at least one recyclable container returned by a consumer for value; B) assigning a transaction identifier to each recycling transaction; and C) storing, in electronic file storage, an indication of each recycling transaction, the indication including the transaction identifier and consumer identifier.

A further embodiment described herein is directed to at least one computer-readable medium is provided having instructions encoded thereon, which instructions, when executed, perform a method of managing information relating to consumer recycling activities. The method comprises acts of: A) performing a recycling transaction with each of a plurality of consumers, each consumer being identifiable via a consumer identifier, each recycling transaction comprising an exchange of at least one recyclable container returned by a consumer for value; B) assigning a transaction identifier to each recycling transaction; and C) storing, in electronic file storage, an indication of each recycling transaction, the indication including the transaction identifier and consumer identifier.

Another embodiment described herein is directed to a system is provided for managing information relating to consumer recycling activities. The system comprises: a transaction controller operable to perform a recycling transaction with each of a plurality of consumers, each consumer being identifiable via a consumer identifier, each recycling transaction comprising an exchange of at least one recyclable container returned by a consumer for value; an assignment controller operable to assign a transaction identifier to each recycling transaction; an electronic file storage; and a storage controller operable to store, in the electronic file storage, an indication of each recycling transaction, the indication including the transaction identifier and consumer identifier.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

Figure 7:
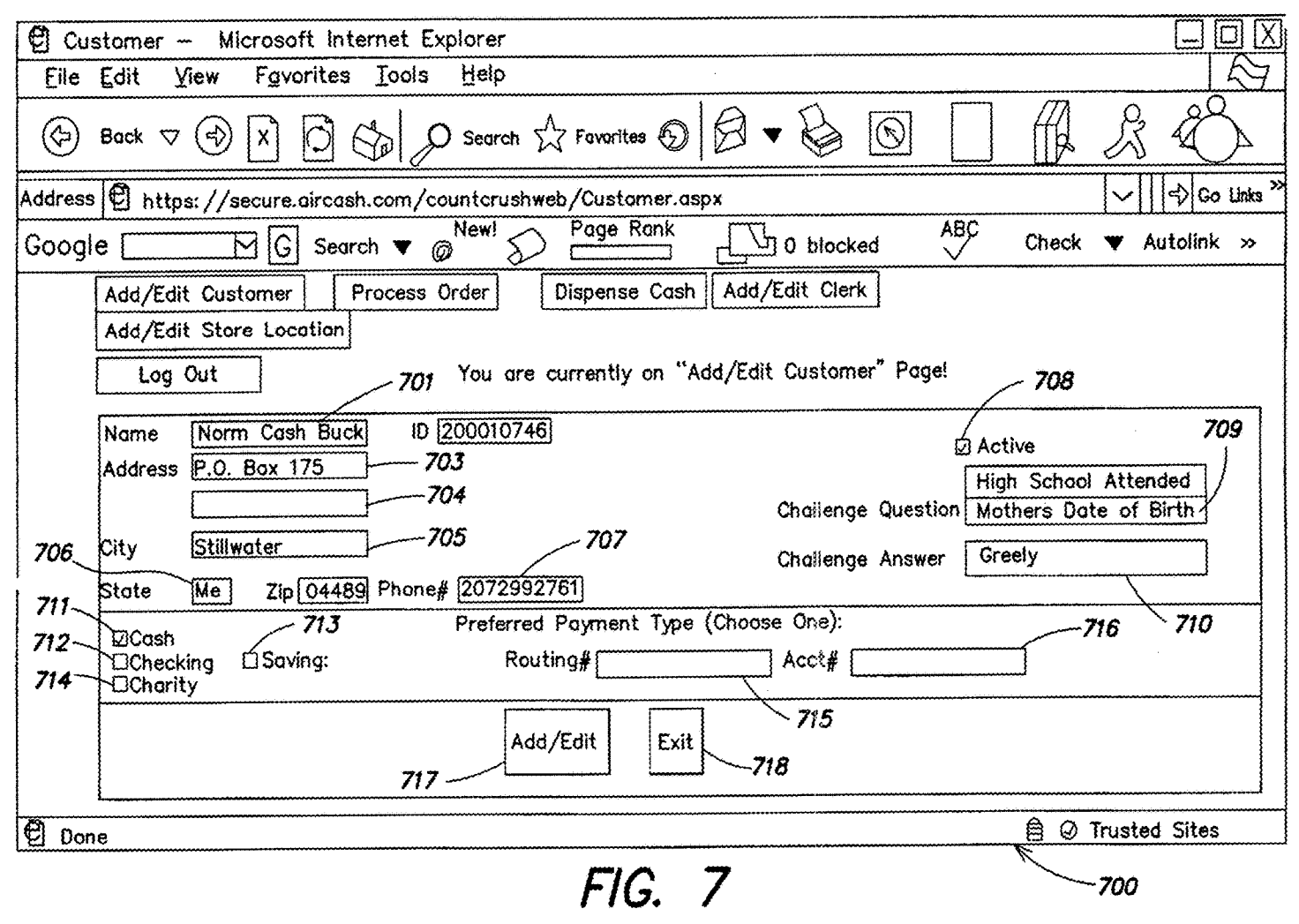

FIG. 7 is a representation of an exemplary screen interface which allows a user to add or edit information relating to a consumer, in accordance with one embodiment of the invention;

Figure 9:
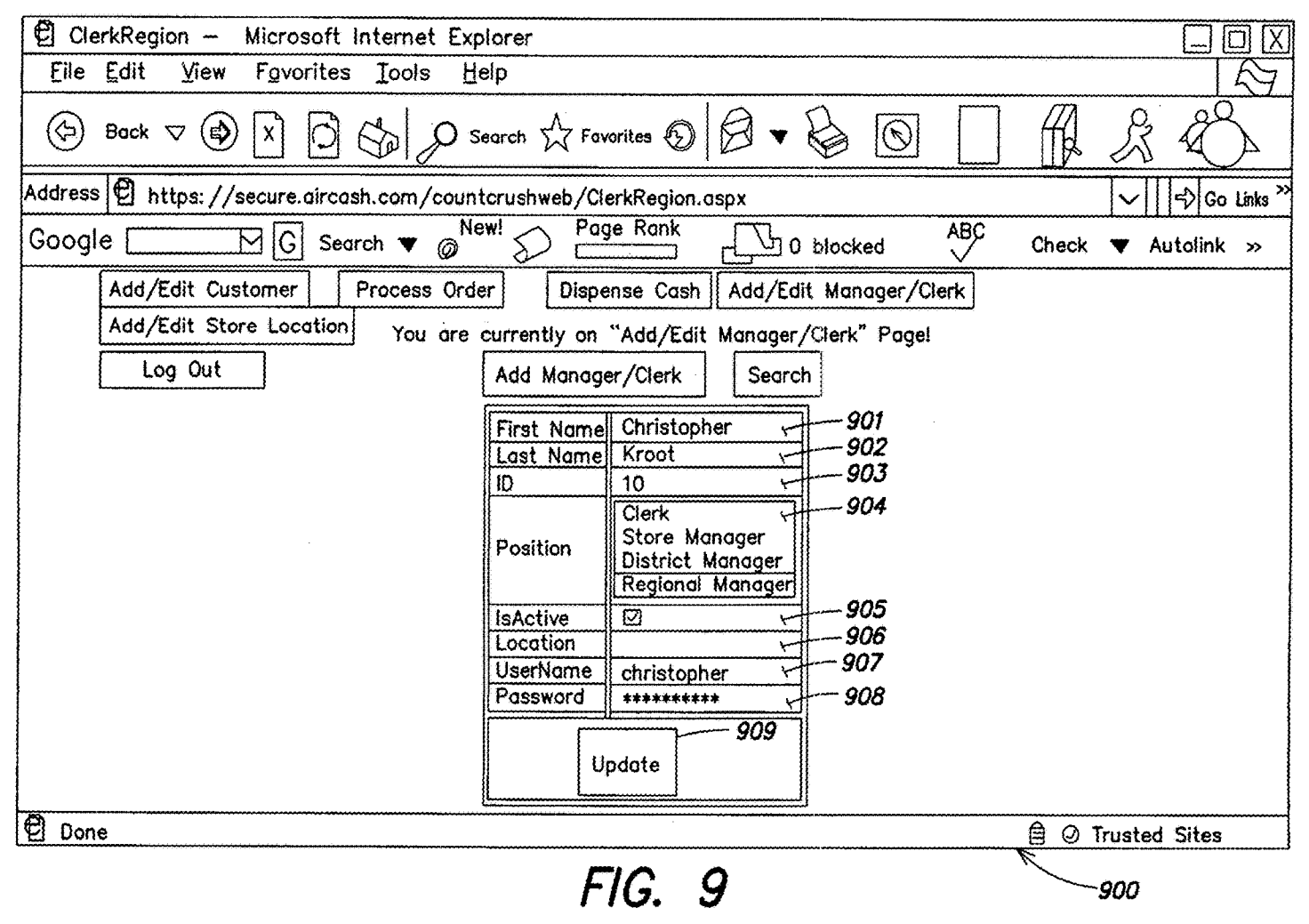

FIG. 9 is a representation of an exemplary screen interface which allows a user to add or edit information relating to a manager or clerk, in accordance with one embodiment of the invention;

Figure 10:
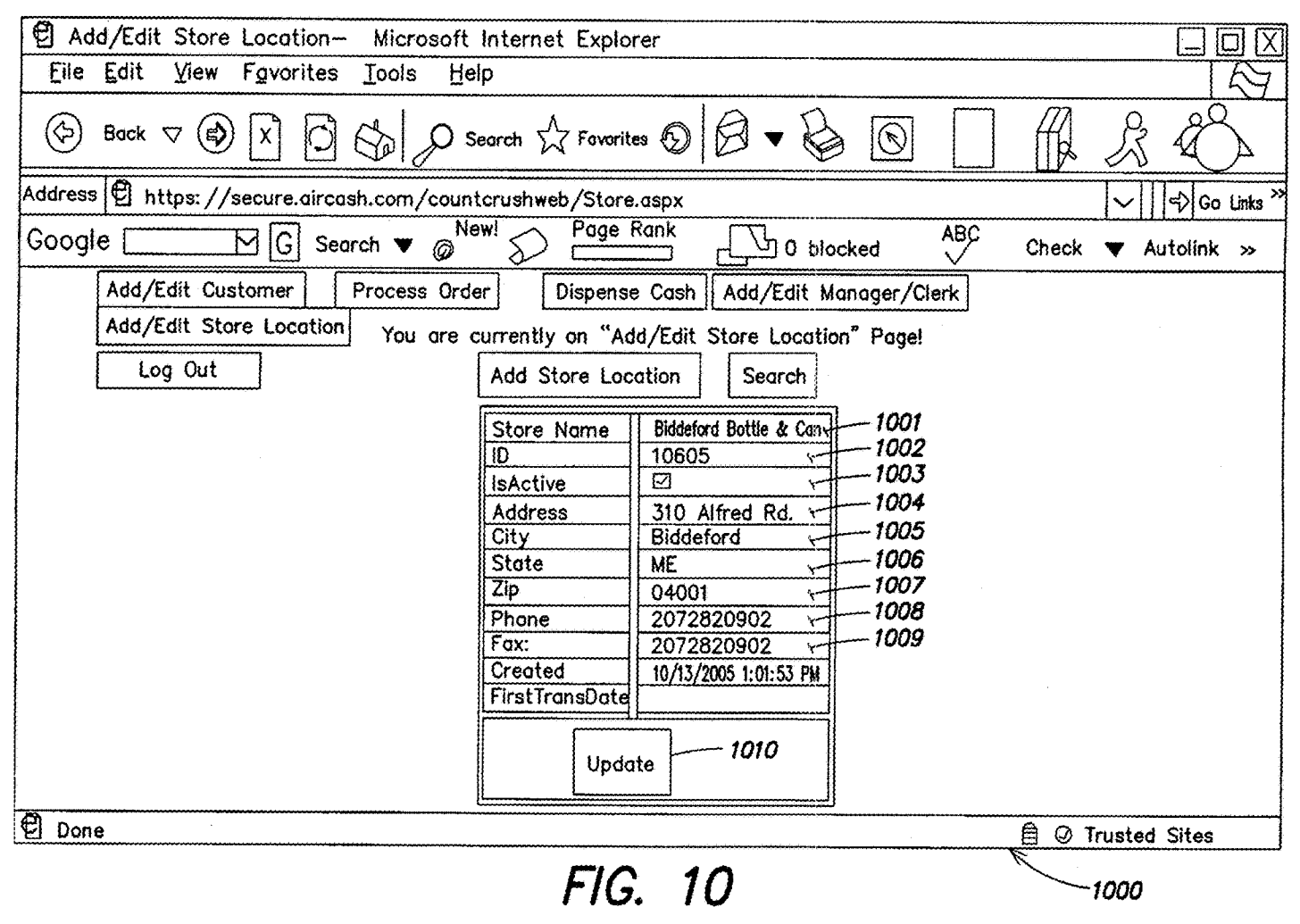

FIG. 10 is a representation of an exemplary screen interface which allows a user to add or edit information relating to particular store location, in accordance with one embodiment of the invention;

DETAILED DESCRIPTION

Figure 1:
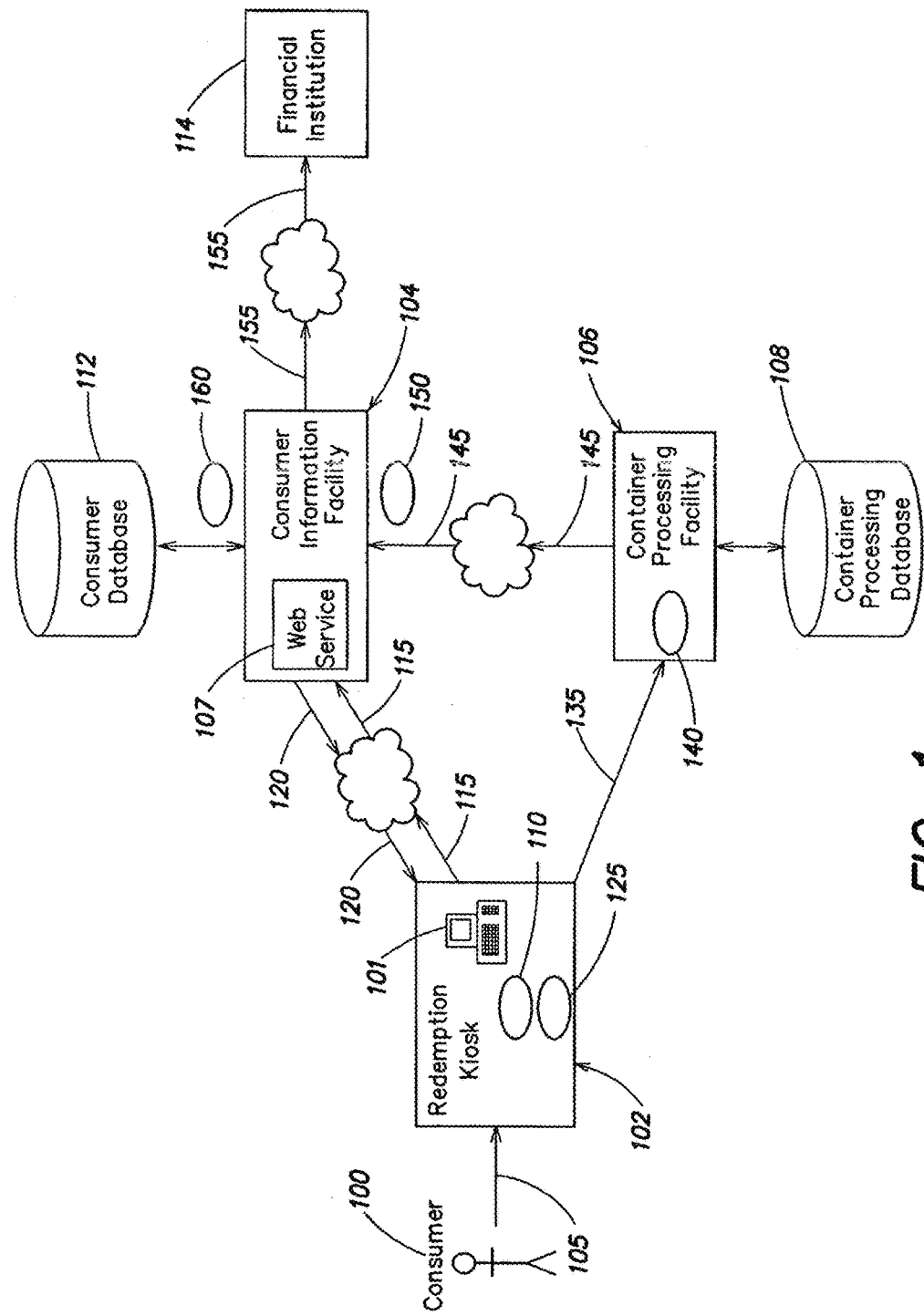
FIG. 1 is a block diagram depicting an exemplary technique for managing information relating to recycling and redemption activities, in accordance with one embodiment of the invention.

In accordance with one embodiment of the invention, a technique for receiving, processing and providing value in exchange for recyclable containers is provided. As described above, conventional arrangements generally require a consumer to transport recyclable containers to a return center which may not project a sanitary appearance, and where the consumer may be forced to wait for an attendant to accept the containers. This may discourage recycling by consumers. In addition, the return center typically houses a large processing apparatus that can occupy a significant amount of floor space. This may be costly when the return center is located at a retail locations, since that floor space may otherwise be used to display products for sale. This may also hinder efforts to encourage recycling.

Embodiments of the invention are designed to address these and other issues associated with conventional arrangements. In accordance with one embodiment, a return center is provided which offers a significantly improved consumer experience. For example, the return center may present a clean look and feel, and not require that a consumer wait in line for an attendant to return recyclable containers. Further, the return center may not occupy an unduly large amount of valuable floor space, but instead may be located outside a retail location, such as in a parking lot, which remains convenient for consumers but allows the retail location to devote the floor space that would otherwise be allocated to the processing apparatus to presenting goods for sale.

In one embodiment, a redemption kiosk, which in one embodiment is a small prefabricated structure, is provided. The structure may be designed to be situated in one or more parking spaces in a lot, or some other area nearby a retail location. One or more attendants may be stationed at the redemption kiosk. When a consumer arrives at the redemption kiosk, he or she may be greeted by one of the attendants, who may preliminarily inspect containers brought by the consumer to the redemption kiosk. Upon inspecting the containers, the attendant may temporarily store the containers inside the redemption kiosk, and provide the consumer with a representation of value (e.g., a paper receipt, coupons, etc.) in exchange for the containers. Later, containers stored at the redemption kiosk may be transported to a processing apparatus at a separate location.

In accordance with one embodiment of the invention, a consumer may register for an account prior to visiting the redemption kiosk, allowing the value provided to the consumer in exchange for the containers to be ascribed to the account and eliminating the need for the consumer to wait for an attendant to count the containers to receive that value. This may expedite the process of returning containers from the consumer's perspective, and thus encourage recycling.

In accordance with one embodiment, upon registering for an account, a consumer may be issued an identifier and provided with an article (e.g., a card, keychain tag, bag in which recyclable containers may be stored, etc.) which has the identifier represented (e.g., printed, encoded, etc.) thereon. When a consumer visits the redemption kiosk, he or she may provide the article (or identifier) to an attendant, who may initiate a transaction to be associated with that identifier. Upon receiving containers returned by the consumer, the attendant may provide the consumer with a representation of value (e.g., a receipt) for the containers, which representation may include the consumer's identifier and/or a separate identifier for the transaction. The attendant may then store the containers at the redemption kiosk so that they are kept separate from containers received from other consumers. For example, containers may be stored in a bag with a paper receipt having the consumer identifier and/or transaction identifier printed thereon. The containers may subsequently be transported to a recycling apparatus for processing. Information represented on the containers (e.g., a bar code or other identifying indicia) may be captured and stored. This information may enable the identification of the value that should be provided to the consumer in exchange for the containers. Value may be provided in any suitable form, including cash or other form of legal tender, credit, coupons, and/or any other form. Once the value is determined, it may be ascribed to the consumer's account (e.g., using the transaction identifier).

In one embodiment, the consumer may nominate another account (e.g., a financial account such as a checking or savings account) to be linked to the account used for recycling activity, such that value ascribed to the recycling account is automatically ascribed to the linked account. Alternatively, the consumer may direct that value ascribed to the recycling account be donated to charity, or be held in the recycling account for the consumer to later withdraw, and/or be assigned, transferred or maintained in any other suitable manner. The invention is not limited in this respect.

One example of a process for receiving, processing and providing value in exchange for recyclable containers is illustrated in FIG. 1. In act 105, a consumer 100 arrives at a redemption kiosk 102 and is greeted by an attendant (not shown). A redemption kiosk 102 may be physically situated in any suitable location. In one embodiment, the kiosk is situated at a location which is familiar and convenient to consumers, such as at a retail location (e.g., a grocery or liquor store), and comprises a prefabricated structure situated outside the retail location so as not to occupy valuable floor space therein. The structure may be modular to allow for flexible adaptation to a variety of settings. For example, when designed to be situated in a parking lot, the structure may be dimensioned to fit in one or more parking spaces, such that the consumer may simply drive up to an adjacent or nearby parking space. When designed to be situated in other settings, the structure may be adapted to suit the dimensions and other characteristics of those settings.

In act 110, the attendant receives an identifier from the consumer. For example, the consumer may supply an article having the consumer identifier represented thereon, such as a card having the identifier electronically encoded thereon and/or a bag holding containers having the identifier printed thereon. The attendant may process the article to determine the identifier, such as by using a magnetic card reader, a bar code reader, other device, via visual inspection, or using some other technique.

In some cases, a consumer may not have been assigned an identifier before arriving at the redemption kiosk. For example, the consumer may not have registered for an account prior to visiting the kiosk. If this is the case, the attendant may ask the consumer whether he or she wishes to register for an account. If so, a facility may be provided at the redemption kiosk which allows the consumer to register for an account. For example, a computer may be provided which provides a web-based interface to a sign-up screen (e.g., the interface described below with reference to FIGS. 6-11), allowing an identifier to be assigned immediately to the consumer. Alternatively, the consumer may be given a form to fill out or be referred to a website to visit later to register.

In other cases, a consumer may have been assigned an identifier before arriving at the redemption kiosk but may not have the article with them which has the identifier represented thereon. For example, the consumer may forget to bring his or her card with the identifier encoded thereon to the kiosk. If so, the consumer may provide the identifier to the attendant verbally, or if the consumer can not remember the identifier, the kiosk may have a facility which allows the attendant to look up the identifier in a database using consumer information, such as the consumer's name, address and/or other information.

In still other cases, a consumer may not have been assigned an identifier and may not wish to register for an account. If so, the consumer may receive value (e.g., cash) immediately from the attendant in exchange for the containers. This scenario is beyond the scope of the process depicted in FIG. 1. The remainder of the description of FIG. 1 below assumes that the consumer either registers for an account prior to visiting the redemption kiosk, or that an account is created (and a consumer identifier is assigned) upon the consumer's arrival.

Returning to FIG. 1, in act 115, the consumer identifier is sent to a consumer information facility as part of a request for a transaction identifier. The transmission of the consumer identifier to the consumer information facility may be accomplished in any suitable way, as the invention is not limited in this respect. In one example, the attendant at redemption kiosk 102 employs a device (e.g., a card reader) which is coupled to computer 101, and computer 101 communicates the consumer identifier via one or more communications networks to consumer information facility 104. The communication network(s) may include any suitable infrastructure and employ any suitable communication protocol(s).

In one embodiment, consumer information facility 104 provides a web service 107 (an implementation well-known to those skilled in the computer programming art) which receives the request sent in act 115. The web service causes a transaction identifier to be generated, such as by accessing consumer database 112, determining the last transaction identifier assigned, and assigning the next identifier in sequence. A logical relationship is created between the transaction identifier and the consumer identifier. In act 120, the transaction identifier is sent to redemption kiosk 102, such as by using the same communication network(s) employed in act 115.

When the transaction identifier is received at the redemption kiosk, the attendant preliminarily counts and/or identifies containers provided by the consumer in act 125. This may be performed manually, using an automatic counting device (e.g., a handheld or automatic scanner or the like), or using any other suitable device and/or technique. Because the count is only preliminary, it need not be exact and can be performed quickly. Based on the preliminary count, the attendant provides the consumer with a representation of value for the containers (e.g., a paper receipt, which may indicate a value attributable to containers received, or another value). The representation may include the transaction identifier and/or consumer identifier.

The attendant may temporarily store the containers at the redemption kiosk, such as in a shelved area designed for that purpose. The containers may be identified as being associated with the considered transaction. For example, a copy of a paper receipt having the transaction identifier printed thereon may be placed with the containers, such as in a bag holding the containers. Of course, multiple sets of containers may be stored at the redemption kiosk, each having their own associated transaction identifier.

The containers are subsequently transported in act 135 to container processing facility 106, where they are processed in act 140. For example, the containers may be transported to a container processing facility 106 by automobile or truck after having been staged for a suitable period, such as a day.

Processing is performed at facility 106 to identify and process (e.g., destroy and/or densify) each of the containers. This may occur in any suitable fashion, as the invention is not limited to a particular implementation. In one example, containers may be processed according to techniques disclosed in commonly assigned U.S. patent application Ser. No. 11/042,479, as described below with reference to FIG. 3.

In one embodiment, processing in act 140 involves processing each container to determine the container's characteristics. For example, a container may have indicia printed thereon (e.g., a bar code) which may be compared to information stored in container processing database 108 to identify the type of container, the material from which it is formed, the distributor to which the material should be delivered, etc. If information on the container can be read and successfully compared to information stored in container processing database 108, the container is densified (e.g., shredded, crushed or otherwise destroyed). The material produced via densification may be stored at container processing facility 106, and information relating to the container may be stored in container processing database 108. An exemplary schema for container processing database is described below with reference to FIG. 4. Information stored therein may include a value which should be given to the consumer in exchange for the container.

If information on a container can not be read or successfully compared to information in container processing database 108, the container may be initially rejected. Containers which are initially rejected may be manually processed to determine whether value should be provided in exchange. For example, an operator may visually inspect a container. If the operator determines that value should be provided in exchange for the container, the operator may employ an input device (e.g., a handheld scanner, mouse, keyboard, etc.) to cause information relating to the container to be entered into container processing database 108. This information may include the container type, size, material, value which should be provided in exchange, and/or any other suitable information. This information may be associated with the considered transaction so that any value attributable to the container may be provided to the consumer.

If the operator determines that the container is one for which no value should be provided (e.g., if the container is being redeemed for deposit in a state other than the one in which it was purchased), then the operator may cause the container to be destroyed, but a value may not be associated with the transaction in container processing database 108.

In act 145, information relating to the containers, and the transaction identifier, is sent from container processing facility 106 to consumer information facility 104 so that an appropriate value for the transaction may be ascribed to the consumer's account. The information may be sent in any suitable fashion, such as via the Internet and/or any other suitable data communication network(s), using any suitable infrastructure and/or protocol(s). The invention is not limited to a particular implementation.

When the information is received at consumer information facility 104, it is processed in act 150 to ascribe a value for the containers included in the transaction to the consumer's account. In one embodiment, the consumer's account is determined based on the transaction identifier, employing the logical relationship established between the transaction identifier and the consumer identifier.

The value that should be applied to the consumer's account may be determined in any of numerous ways. In one example, an indication of the value to be ascribed may be sent by container processing facility 106 in act 145 and applied by consumer information facility 104 in act 150. In another example, the information sent in act 145 may include information on individual containers, such that consumer information facility 104 performs a lookup (e.g., on container information stored in consumer database 112) to determine a value attributable to each container that should be applied to the consumer's account.

As described above, a consumer may nominate a separate account to be linked to the recycling account maintained by consumer information facility 104. In the embodiment shown, the separate linked account is at financial institution 114. In act 155, consumer information facility 104 provides information to financial institution 114 which is usable thereby to credit the value attributable to the containers to the consumer's account at financial institution 114. This information may include, for example, the account number, a routing number for a financial institution at which the account is held, the transaction identifier, the value to be ascribed to the account, and/or other information. When this information is provided, the financial institution may apply the value for the transaction the consumer's account.

As an alternative, instead of nominating a separate linked account to which value should be transferred, the consumer may direct that value should be held in the recycling account for subsequent withdrawal. The consumer may, for example, be issued a card having a consumer identifier represented thereon which is usable to access this account (e.g., this card may be the article described above with reference to act 110). The card may be presentable by the consumer, for example, at retail locations, such that value held in the consumer's account may be applied toward purchases and/or other transactions at these retail locations. Of course, a card need not be issued to the consumer for the consumer to be able to withdraw value from the account. Any suitable technique for allowing a consumer access to the value held in the account may be employed, as the invention is not limited in this respect.

In act 160, information relating to the transaction is stored in consumer database 112. Any suitable information may be stored, including the types of containers processed in act 140 (e.g., provided to consumer information facility 104 in act 145), the date and time the consumer visited the redemption kiosk 104 (e.g., captured during act 117), and/or other transaction information. Consumer database 112 may later be queried to access information on redemption activities by particular consumers, the redemption of particular containers, containers provided to particular distributors, and/or other information. This is described in further detail below.

It should be appreciated that the process described with reference to FIG. 1 is merely an example, and that numerous variations are possible. For example, consumer information facility 104 need not employ a web service 107 to assign a transaction identifier, container information database 108 need not be co-located with container processing facility 106, and consumer information facility 104 need not be co-located with consumer information database 112. Further, instead of linking a financial account to his or her recycling account, a consumer may instruct that the value for a recycling transaction be given to a charitable organization. The invention is not limited to any particular implementation.

As described above, containers may be transported from the redemption kiosk to a container processing facility. At such a facility, information on the containers may be identified, information relating to the containers may be stored in a database, and the containers may be destroyed. One example of a technique for processing containers is described in commonly assigned U.S. patent application Ser. No. 11/042,479, entitled "Method and Apparatus for Processing Recyclable Containers," which is incorporated by reference herein in its entirety. For ease of description, relevant portions of the above-referenced application are summarized below, but it should be appreciated that the present invention is not limited to employing such techniques. Embodiments of the invention may be implemented in any of numerous ways.

The exemplary container processing technique described in the above-referenced application is summarized below with reference to FIG. 2. At the start of process 200, a container is received by the system in act 210. A container may be manually or automatically fed to the system. In one embodiment, a container may be presented manually (e.g., by an operator) to the system via an intake platform. However, any suitable intake mechanism may be employed.

At the completion of act 210, the process proceeds to act 220, wherein one or more defining characteristics of the container are determined. For example, a scanner may be employed to determine a characteristic of the container, such as a bar code or some other identifying indicia represented on the surface of the container. The characteristics may then be compared to information stored in electronic file storage to determine whether the characteristics are known to represent a particular recyclable container.

The process then proceeds to act 230, wherein a determination is made as to whether the container characteristics were identified successfully in act 220. For example, act 230 may involve determining whether a scanning device was able to successfully locate a bar code on the surface of the container, and if so, whether the information was compared successfully to data stored in electronic file storage. If it is determined that the container characteristics were not identified successfully, the process proceeds to act 240, wherein the container is rejected. For example, the container may be directed to a reject bin.

If it is determined in act 230 that the characteristics of the container were identified successfully in act 220, the process proceeds to act 250, wherein an indication of the successful identification is stored in electronic file storage and the appropriate densification device for the container is selected. In one embodiment, information stored in electronic file storage may define an association between a particular characteristic (e.g., a bar code) and a densification device. For example, an association may define that containers formed from a aluminum should be directed to a shredder device.

At the completion of act 250, the process proceeds to act 260, wherein the container is conveyed to a specific densification device. In act 270, the container is destroyed using the densification device. The container is then received in a bin in act 280, whereupon process 200 completes.

Figure 2:
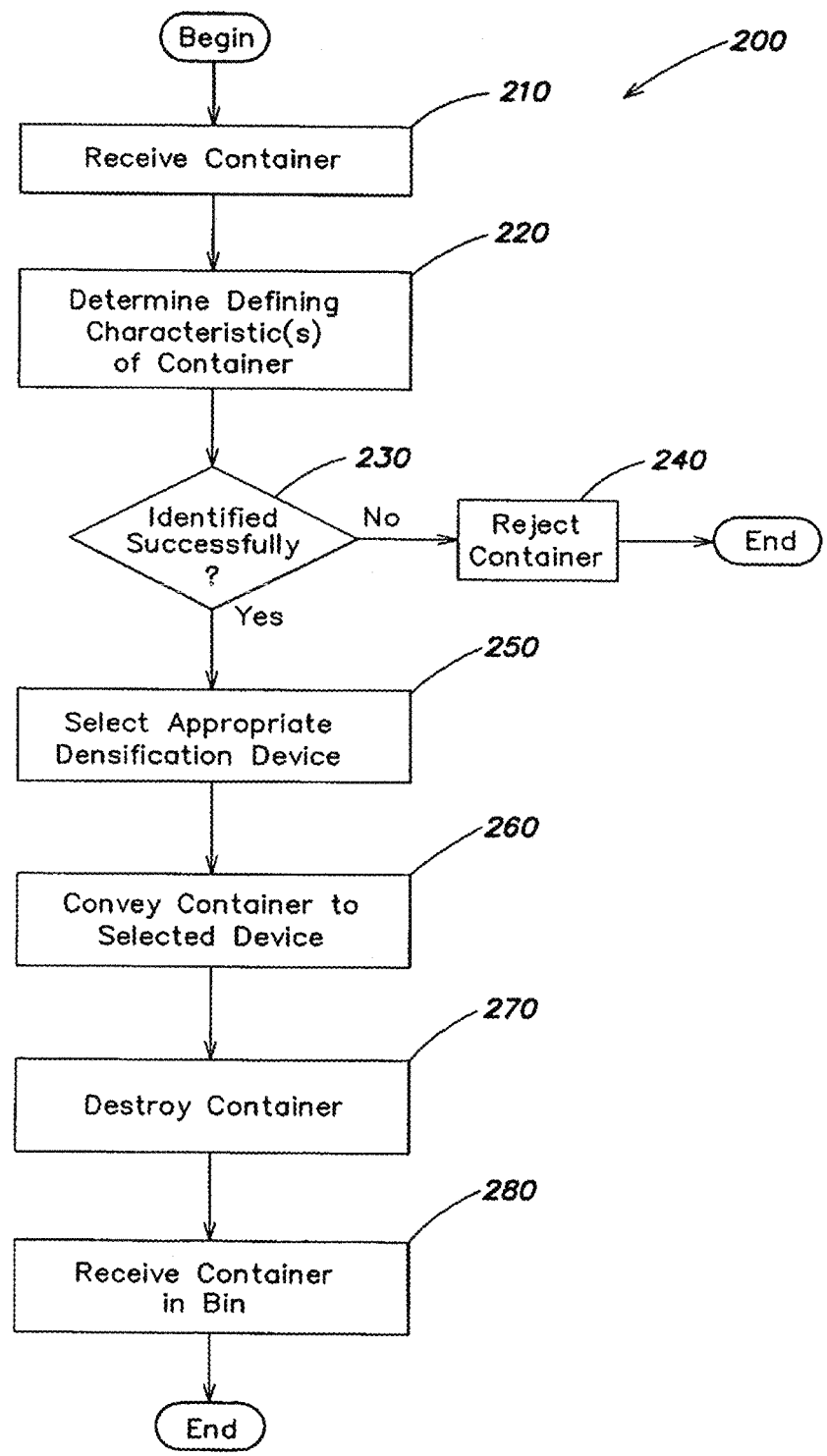
FIG. 2 is a flowchart depicting an exemplary technique for processing containers returned by a consumer, in accordance with one embodiment of the invention.
Figure 3:
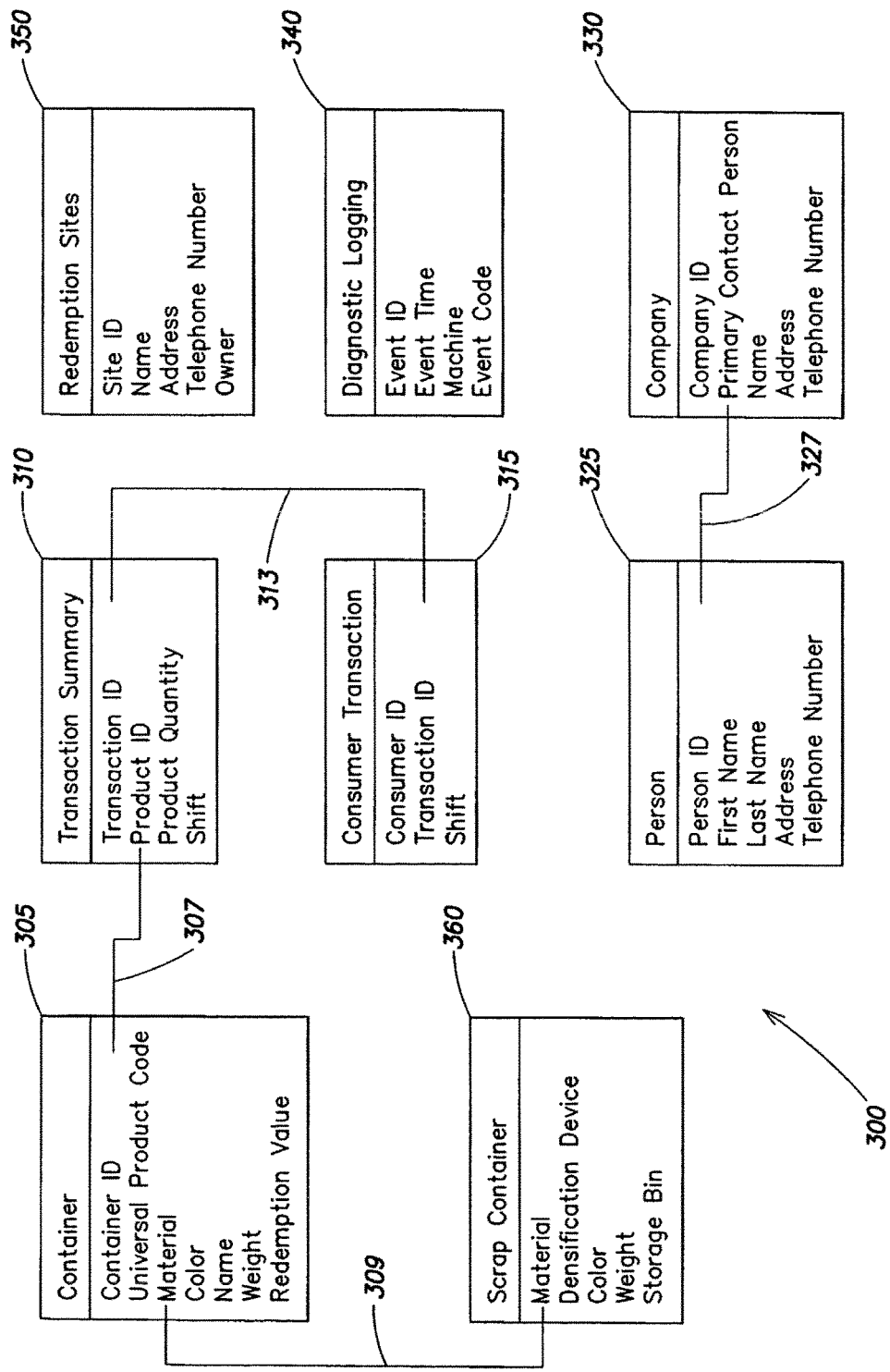
FIG. 3 is a representation of an exemplary schema for organizing information relating to recyclable containers, in accordance with one embodiment of the invention.

During the process of FIG. 2, information relating to successfully processed containers is stored in electronic file storage, such as in container processing database 108. A simplified schema 300 defining one manner of storing information in container processing database 108 is shown in FIG. 3.

Schema 300 includes representations of a plurality of tables, each containing a plurality of fields (e.g., columns) in which data elements relating to containers are stored. As with many relational databases, certain fields in each table are related to fields in other tables via a foreign key to ensure that information in each table remains consistent. In this exemplary schema 300, container table 305 stores data elements which identify individual containers, including a container identifier, Universal Product Code (UPC), material, color, name, weight and redemption value. A foreign key maintains consistency between the container identifier stored in container table 305 and the product identifier stored in transaction summary table 310, which also stores data elements describing individual redemption transactions. This table also stores a transaction identifier, product quantity, and shift during which the considered transaction was processed. A foreign key maintains consistency between the transaction identifiers stored in transaction summary table 310 and consumer transaction table 315, which provides a cross-reference between a consumer identifier (e.g., the identifier represented on the article presented by the consumer in act 110, FIG. 1) and the transaction identifier.

Schema 300 also includes person table 325, which stores information on distributors or other third parties which receive the containers after processing. The person table stores the first name, last name, address and telephone numbers for these parties. A foreign key maintains consistency between the person identifier stored in person table 325 and the primary contact person stored in company table 330, which also stores corporate-level information for the parties named in person table 325. Fields stored in company table 330 include the name, address and telephone number for each party.

Also represented by schema 300 is diagnostic logging table 340, which stores information relating to events occurring on the container processing facility for diagnostic purposes. This table stores data elements including an event time, machine affected, and code for each captured event. As indicated by the machine affected field, this table may store information on events occurring on more than one container processing facility. Information on events may be transferred between facilities using any suitable technique, such as database replication (e.g., event information stored in one container processing database 108 may be replicated to other, similar databases maintained at other container processing facilities 106).

Schema 300 also includes a representation of redemption site table 350, which stores information on individual redemption kiosks. Redemption site table 350 stores data elements including the name, address, telephone number and owner for each center.

Also represented by schema 300 is scrap container table 360, which stores information on materials from which recyclable containers are formed. Scrap container table 360 maintains a cross-reference between various types of materials and the densification device used to process each, and also stores data elements including a color, weight and storage bin for each material type.

Figure 4:
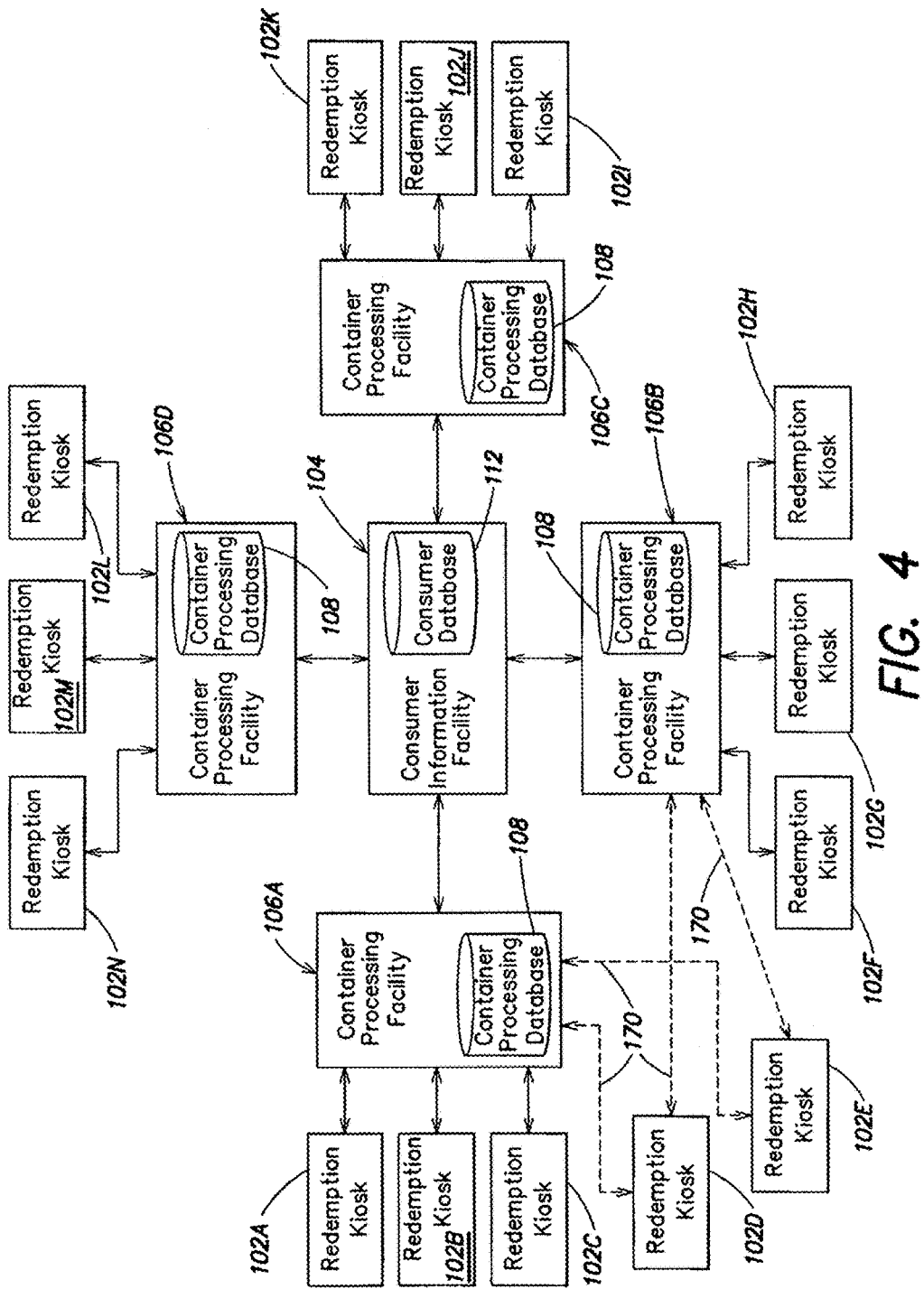
FIG. 4 is a block diagram depicting relationships between one or more redemption kiosks, container processing facilities and consumer information facilities, in accordance with one embodiment of the invention.

The manner in which schema 300 is organized provides for flexible relationships between different information stored in various tables. One result is that schema 300 allows for one-to-many, many-to-one and many-to-many relationships between redemption kiosks and container processing facilities. FIG. 4 illustrates one manner in which redemption kiosks, container processing facilities and a consumer information facility may be related or organized. Specifically, FIG. 4 illustrates that redemption kiosks, container processing facilities and a consumer information facility may be organized in a "hub and spoke" fashion, such that information flows through the spokes formed by redemption kiosks and container processing facilities toward the hub formed by the consumer information facility.

In the embodiment shown in FIG. 4, consumer information facility 104 at the hub receives information from a plurality of container processing facilities 106A-106D. Each container processing facility 106 receives information and containers from a plurality of redemption kiosks 102. For example, container processing facility 106A receives information and containers from redemption kiosks 102A-102C, and container processing facility 106B receives information and containers from redemption kiosks 102F-102H. Information flow from redemption kiosks 102 via container processing facilities 106 to the consumer information facility 104 allows for the aggregation of information relating to consumer recycling activities at consumer information facility 104, and more specifically in consumer database 112.

As indicated by the dotted lines 170 in FIG. 4, the hub and spoke organization is flexible in that information need not always flow from redemption kiosks 102 to the same container processing facilities 106. For example, the dotted lines 170 between redemption kiosks 102D and 102E and container processing facilities 106A and 106B indicates that information may flow from redemption kiosks 102D and 102E to either container processing facility 106A or 106B. The determination of a particular container processing facility 106 to which information (and/or containers) from a particular redemption kiosk 102 is sent may be based on any of numerous factors, including the capacity and workload of each container processing facility, each facility's ability to handle containers of a particular type and/or material, the current status of a facility, and/or other factors.

In the exemplary arrangement illustrated in FIG. 4, information from each container processing facility 106 is provided to a single consumer information facility 104. However, this need not be the case, as multiple consumer information facilities 104 may alternatively be provided, each receiving information from one or more container processing facilities 106. Each consumer information facility 104 may share information with each other consumer information facility 104, such as by performing a database replication procedure well-known to those skilled in the art, such that information stored in one consumer database 112 (e.g., maintained at a first consumer information facility 104) is replicated to one or more other consumer databases 112 (e.g., maintained at one or more other consumer information facilities 104).

Figure 5:
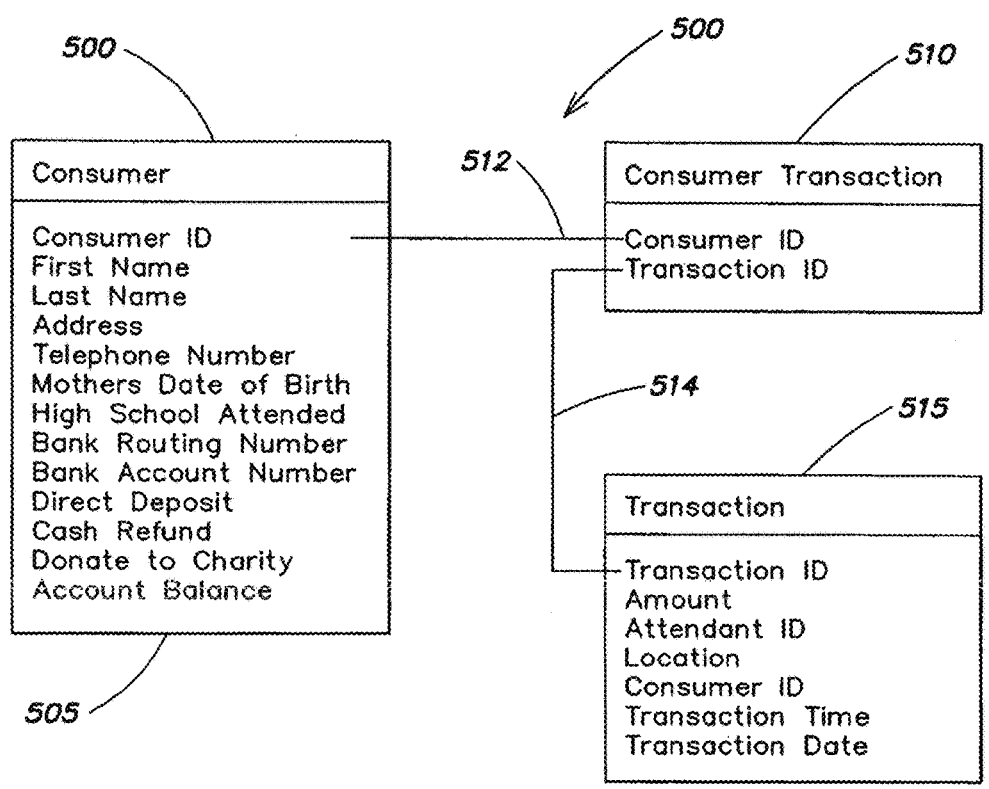
FIG. 5 is a representation of an exemplary schema for organizing information relating to consumers, in accordance with one embodiment of the invention.
Figure 6:
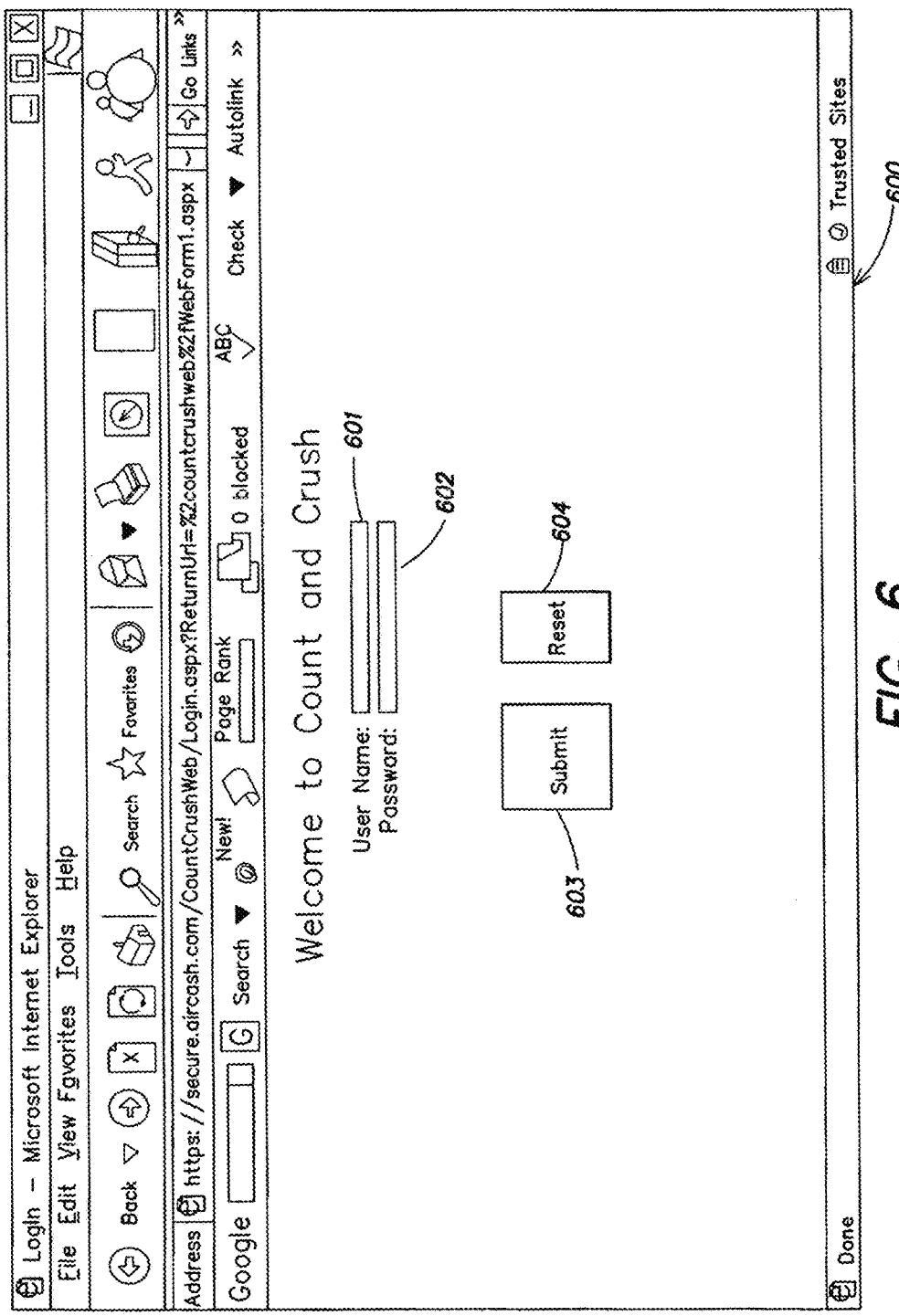
FIG. 6 is a representation of an exemplary screen interface which allows a user to enter verification information relating to a consumer, in accordance with one embodiment of the invention.
Figure 8:
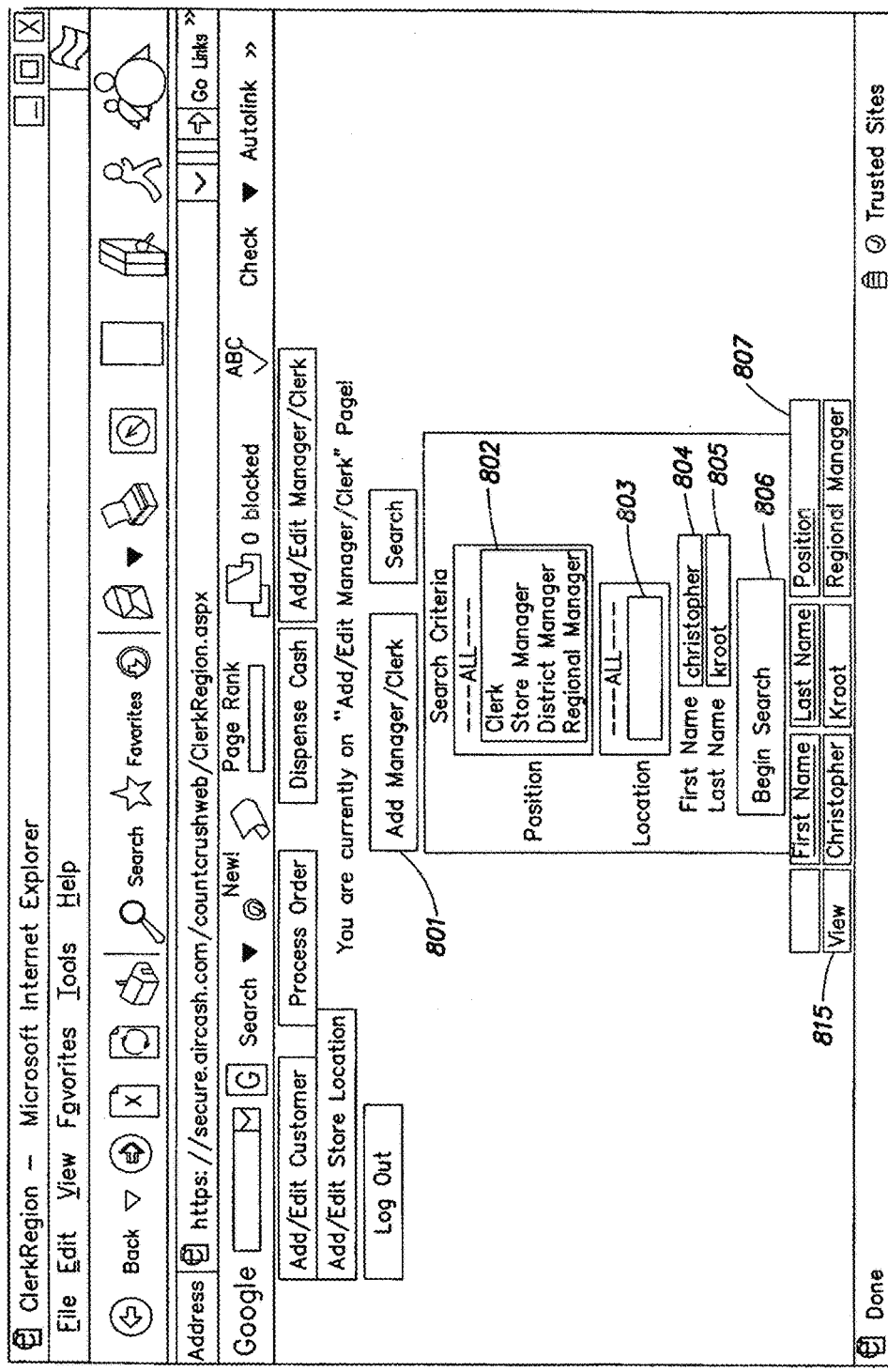
FIG. 8 is a representation of an exemplary screen interface which allows a user to add or search for information relating to a manager or clerk, in accordance with one embodiment of the invention.

As a result of the organization shown in FIG. 4, information relating to consumer recycling activities may be aggregated and organized in one or more consumer databases 112. A simplified schema 500 defining an exemplary manner of storing information in a consumer database 112 is shown in FIG. 5. Schema 500 includes representations of consumer table 505, consumer transaction table 510 and transaction table 515.

Consumer table 505 stores various data identifying individual consumers, including a consumer identifier (also represented on the article described above with reference to act 110, FIG. 1), first name, last name, address and telephone number. Consumer table 505 also stores the consumer's mother's maiden name and high school attended, which may be employed to support security and verification functions described further below. In addition, consumer table 505 stores a bank routing number, bank account number, direct deposit indicator, cash refund indicator, donate to charity indicator and account balance, which may be employed to support transfers of value from the consumer's recycling account to other accounts or transferees. A foreign key 512 is employed to maintain consistency between the consumer identifier in consumer table 505 and the consumer identifier stored in consumer transaction table 510.

Consumer transaction table 510 maintains a cross-reference between the consumer identifier and transaction identifier generated in act 117 (FIG. 1). As such, in addition to the foreign key used to maintain consistency with the consumer identifier in consumer table 505, a foreign key 514 is employed to maintain consistency with the transaction identifier stored in transaction table 515.

Transaction table 515 stores information relating to recycling transactions. In addition to the transaction identifier, transaction table 515 stores an amount for the transaction, which for a particular transaction may be preliminarily defined when an attendant counts the beverage containers that a consumer returns to the redemption kiosk 102 (e.g., in act 125, FIG. 1) and later updated after the containers are processed at a container processing facility 106 (e.g., in act 150, FIG. 1). Transaction table 515 also stores an identifier for the attendant who processes the recycling transaction, the location of the redemption kiosk (e.g., a geographic location), the consumer identifier, and the time and date of the transaction.

It should be appreciated that the information stored in container processing database 108 and consumer database 112 provides significant insight into recycling activities by particular consumers, or consumers in aggregate. For example, accessing information stored in transaction table 515 (FIG. 5) can provides insight into the frequency and location of a particular consumer's recycling activities, or can provide an indication of the average value for a recycling transaction across all consumers.

It should also be appreciated that because container processing database 108 and consumer database 112 store common data elements including the consumer identifier and transaction identifier, information stored in one database may be cross-referenced with information in the other database to provide a more comprehensive view of consumer recycling and beverage consumption activities. For example, a query may be executed on transaction table 515 using a particular consumer identifier to determine the frequency of that consumer's recycling activities, and the transaction identifier associated with each recycling transaction. Using the transaction identifiers determined in this first query, a second query may be executed on transaction summary table 310 (FIG. 3) to determine the beverage containers, and quantity of each, processed in each transaction. This information may offer insight into the consumer's favorite beverages, the amount of these beverages that the consumer tends to purchase, the frequency of purchase (or at least the frequency of recycling), and whether there appears to be any seasonality to these purchases. The information generated in these queries may be used to fashion marketing offers tailored to the consumer's demonstrated habits, such as by offering coupons to the consumer for her favorite beverages at the time that it appears she would normally purchase them.

Further, it should be appreciated that databases 112 and 108 may support any of numerous queries to discern consumer behavior with respect to beverage purchases, consumption, container recycling/or and other information. The information generated thereby may be extremely valuable in supporting marketing targeted toward each consumer based on that consumer's demonstrated behavior. Such marketing efforts may be more effective and efficient than some conventional marketing efforts like mass mailings in that they may be more likely to present the right offer to the consumer at the right time. Those familiar with so-called "one-to-one" marketing efforts and/or the computer programming arts may be capable of designing queries and/or marketing programs based on this disclosure to facilitate such efforts.

FIGS. 6-10 depict screen interfaces by means of which consumer account information may be established, maintained and administered. For example, interface 600 (FIG. 6) includes fields 601 and 602, which allow a user (e.g., an administrator, or the consumer) to provide a user name and password to access a particular account. Upon entering information into fields 601 and 602, the user may click button 603 to "submit" this information so that the user's identity may be verified. Alternatively, the user may click button 604 to "reset" (e.g., remove) information entered into fields 601 and 602.

If upon clicking button 603 the user's identity is successfully verified, interface 700 (FIG. 7) may be presented. Interface 700 allows a number of data elements relating to a particular consumer to be added and/or edited. For example, a consumer's name may be entered into field 701, an address may be entered in fields 703-706, and a telephone number may be entered in field 707. Box 708 allows the user to designate whether a consumer's account is currently active.

Boxes 709-710 allow the user to enter information which forms the basis for a "challenge question" which may be used to verify the consumer's identity, such as when the consumer forgets to bring the article described above having a consumer identifier represented thereon to redemption kiosk 102. For example, box 709 allows the user to select one of "high school attended" and "mother's date of birth" for the challenge question, and box 710 allows the user to enter the appropriate answer.

Boxes 711 through 714 allow the user to designate whether another account is linked to the recycling account, such that value may be transferred from the recycling account to the designated account. Using box 711, a user may designate that any value be kept in the recycling account as "cash" which may later be withdrawn. Using box 712 the user may designate a checking account to be linked, using box 713 a savings account may be linked, using box 714 a charity may be designated. If a checking or savings account is designated in boxes 712-713, the user may enter routing and account numbers in boxes 715-716.

Upon completing the entry of information in interface 700, the user may click button 717 to "add/edit" the information entered to consumer database 112. Alternatively, the user may click button 718 to "exit" from interface 700 such that the information is not entered.

Interface 800 (FIG. 8) allows the user to add or edit a manager or clerk to the database (e.g., an attendant or employee), who may have authority to access or edit consumer accounts. By clicking button 801, the user begins the "add manager/clerk" process. After, the user may select from a listing of positions in box 802, a listing of locations shown in box 803, and enter the employee's first and last name in boxes 804-805.

The user may also search for information on particular managers or clerks by entering the employee's first or last name in boxes 804-805 and clicking button 806 to "begin search". This may cause a query to be created and submitted, and the results to be displayed in portion 807. By clicking button 815 to "view" more detail relating to the selected employee, the user may cause interface 900 (FIG. 9) to be displayed.

Interface 900 allows information relating to a particular manager or clerk to be added or edited. For example, the manager or clerk's first name, last name, identifier, position, active indicator, location, user name and password may be accessed in boxes 901-905, respectively. In order for the entered information to be added to the database, the user may be required to supply a user name and password in boxes 907-908 and click box 909 to "update" the database.

Interface 1000 (FIG. 10) allows information relating to a particular store (e.g., redemption kiosk) location to be added or edited. For example, the user may enter information including a store name, identifier, active indicator, address, telephone number, and fax number for a store location using fields 1001-1009, and click button 1010 to cause the information to be entered to the database.

Figure 11:
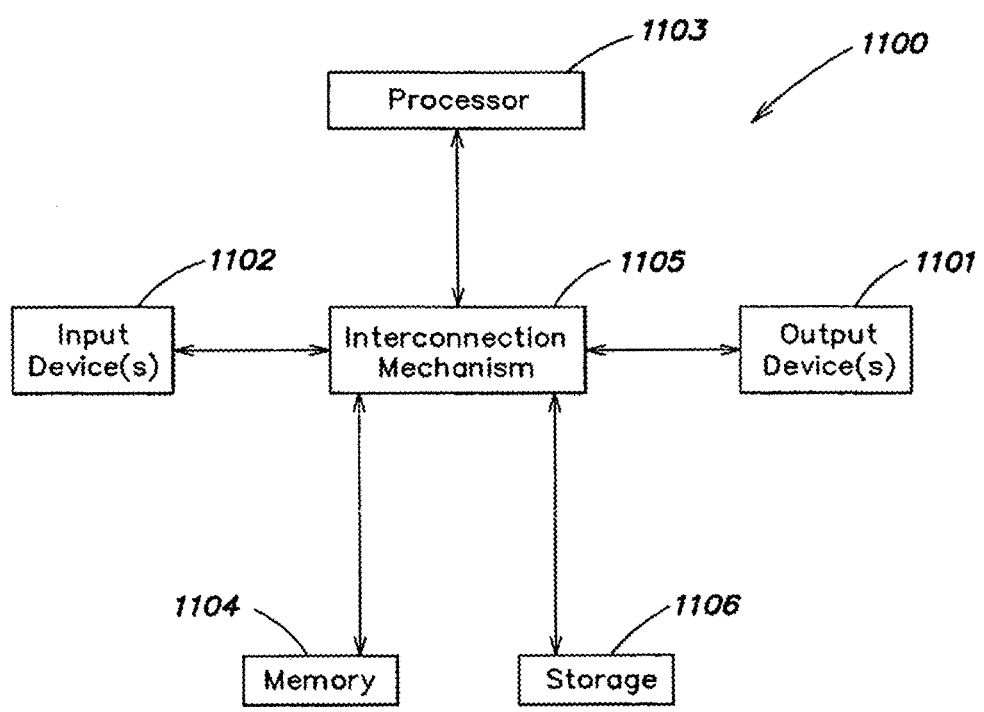
FIG. 11 is a block diagram depicting an exemplary computer system on which aspects of embodiments of the invention may be implemented.

As should be appreciated from the description above, various aspects of the invention may be implemented on one or more computer systems, such as the exemplary system 1100 shown in FIG. 11. Computer system 1100 includes input device(s) 1102, output device(s) 1101, processor 1103, memory system 1104 and storage 1106, all of which are coupled, directly or indirectly, via interconnection mechanism 1105, which may comprise one or more buses or switches. The input device(s) 1102 receive input from a user or machine (a human operator) and the output device(s) 1101 display(s) or transmit(s) information to a user or a machine (e.g., a liquid crystal display).

The processor 1103 executes a program called an operating system which controls the execution of other computer programs, and provides scheduling, input/output and other device control, accounting, compilation, storage assignment, data management, memory management, communication and data flow control. The processor 1103 and operating system define the platform for which application programs and other computer programming languages are written.

The processor 1103 may also execute one or more programs to implement various functions, such as those which embody aspects of the invention. These programs may be written in a computer programming such as a procedural language, object-oriented language, macro language, or combination thereof.

Figure 12:
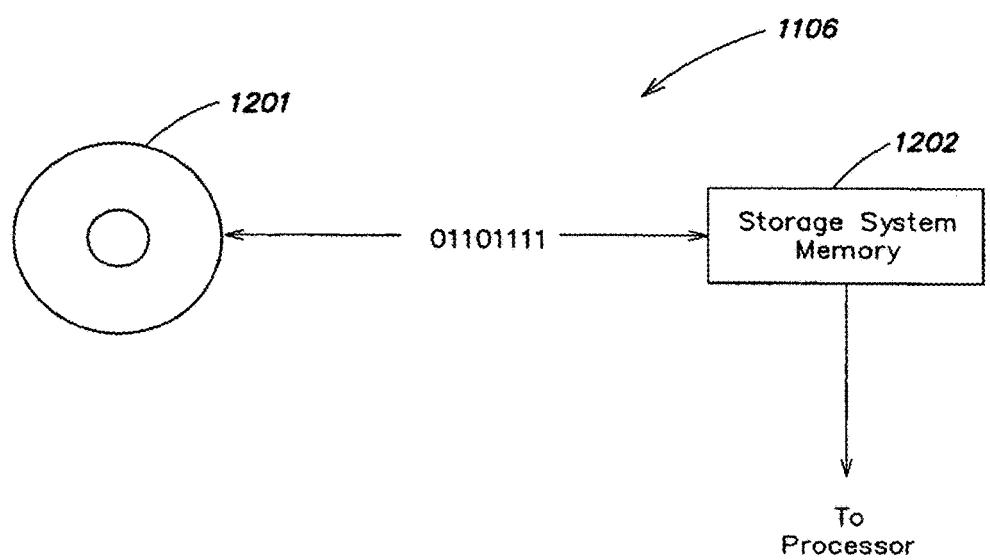
FIG. 12 is a block diagram depicting an exemplary memory on which aspects of embodiments of the invention may be implemented.

These programs may be stored in storage system 1106. The storage system may hold information on a volatile or non-volatile medium, and may be fixed or removable. Storage system 1106 is shown in greater detail in FIG. 12. It typically includes a computer-readable and—writable non-volatile recording medium 1201, on which signals that define the program, or information to be used by the program, are stored. The medium may, for example, be a disk or flash memory. Typically, in operation, the processor 1203 causes data to be read from the non-volatile recording medium 1201 into a volatile memory 1202 (e.g., a random access memory, or RAM) that allows for faster access to the information by processor 1203 than does the medium 1201. Memory 1202 may be located in storage system 1106, as shown in FIG. 11, or in memory system 1204, as shown in FIG. 12. The processor 1103 generally manipulates the data within the integrated circuit memory 1104, 1202, and then copies the data to the medium 1201 after processing is completed. A variety of mechanisms are known for managing data movement between the medium 1201 and the integrated circuit memory 1104, 1202, and the invention is not limited thereto. The invention is also not limited to a particular memory system 1204 or storage system 1106.

It should also be appreciated that the above-described embodiments of the invention may be implemented in any of numerous ways. For example, the above-discussed functionality may be implemented using software, hardware or a combination thereof. When implemented in software, the software code can be executed on any suitable processor or collection of processors, whether provided in a single computer or distributed among multiple computers. It should further be appreciated that any component or collection of components that perform the function as described herein may generically be considered as one or more controllers that control the above-described function. The one or more controllers may be implemented in numerous, such as with dedicated hardware, or by employing one or more processors which are programmed using microcode or software to perform the functions recited above. Where a controller stores or provides information for system operation, such information may be stored in a central repository, in a plurality of repositories, or a combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method, comprising:
transporting a first bag associated with a first consumer, the first bag holding a first plurality of recyclable containers, and a second bag associated with a second consumer, the second bag holding a second plurality of recyclable containers, from a retail location recycling return center to a processing center;
receiving, from a scanning device located at the processing center, a first set of information for the first bag representing a first recycling transaction, the first set of information including information about individual recyclable containers of the first plurality of recyclable containers;
receiving, from the scanning device located at the processing center, a second set of information for the second bag representing a second recycling transaction, the second set of information including information about individual recyclable containers of the second plurality of recyclable containers;
associating, in at least one memory, the first set of information with a first consumer account associated with the first consumer and the second set of information with a second consumer account associated with the second consumer; and
in response to receiving a query relating to a plurality of recycling transactions from at least one input device, accessing in the at least one memory information relating to at least the first and second sets of information.

2. The method of claim 1, further comprising scanning the first and second pluralities of recyclable containers using the scanning device to determine the first and second sets of information.

3. The method of claim 2, wherein the scanning device comprises a barcode scanner.

4. The method of claim 1, wherein the first set of information comprises a redemption value for each of the first plurality of recyclable containers, and the second set of information comprises a redemption value for each of the second plurality of recyclable containers.

5. The method of claim 1, wherein the first set of information comprises a material for each of the first plurality of recyclable containers, and the second set of information comprises a material for each of the second plurality of recyclable containers.

6. The method of claim 1, wherein the first set of information comprises a Universal Product Code (UPC) for each of the first plurality of recyclable containers, and the second set of information comprises a UPC for each of the second plurality of recyclable containers.

7. The method of claim 1, wherein the first set of information comprises a container identifier for each of the first plurality of recyclable containers, and the second set of information comprises a container identifier for each of the second plurality of recyclable containers.

8. The method of claim 1, wherein the first set of information comprises a type for each of the first plurality of recyclable containers, and the second set of information comprises a type for each of the second plurality of recyclable containers.

9. The method of claim 1, wherein each recyclable container of the first plurality of recyclable containers has a deposit refund amount associated therewith, and wherein the method further comprises refunding to the first consumer the deposit refund amount based on the first set of information.

10. The method of claim 1, wherein the accessed information relating to at least the first and second sets of information comprises a value corresponding to at least the first and second pluralities of recyclable containers, and wherein the plurality of recycling transactions correspond to a plurality of consumers.

11. The method of claim 1, further comprising directing marketing activities based at least in part on the first and second sets of information.

12. The method of claim 1, further comprising, based at least in part on the first set of information, electronically transmitting information usable to credit the first consumer with a value ascribed, at least in part, to the first recycling transaction.

13. The method of claim 1, further comprising displaying at least the first and second sets of information.

14. The method of claim 1, wherein the accessed information relating to at least the first and second sets of information comprises an average value for the plurality of recycling transactions, and wherein the plurality of recycling transactions correspond to a plurality of consumers.

* * * * *